US010124272B2

(12) United States Patent
Tanaka et al.

(10) Patent No.: US 10,124,272 B2
(45) Date of Patent: Nov. 13, 2018

(54) VAPOR CIRCULATION REGENERATION SYSTEM

(71) Applicant: CHUGAI RO CO., LTD., Osaka-shi, Osaka (JP)

(72) Inventors: Junya Tanaka, Osaka (JP); Masamichi Yamamura, Osaka (JP); Kunihiro Kitahashi, Osaka (JP)

(73) Assignee: CHUGAI RO CO., LTD., Osaka (JP)

( * ) Notice: Subject to any disclaimer, the term of this patent is extended or adjusted under 35 U.S.C. 154(b) by 0 days.

(21) Appl. No.: 15/573,080

(22) PCT Filed: Mar. 4, 2016

(86) PCT No.: PCT/JP2016/056864
§ 371 (c)(1),
(2) Date: Nov. 9, 2017

(87) PCT Pub. No.: WO2016/181692
PCT Pub. Date: Nov. 17, 2016

(65) Prior Publication Data
US 2018/0140967 A1 May 24, 2018

(30) Foreign Application Priority Data

May 14, 2015 (JP) .................................. 2015-099346

(51) Int. Cl.
*B01D 5/00* (2006.01)
*B01D 1/00* (2006.01)
(Continued)

(52) U.S. Cl.
CPC ............... *B01D 5/006* (2013.01); *B01D 1/00* (2013.01); *B01D 1/0011* (2013.01);
(Continued)

(58) Field of Classification Search
CPC ........ B01D 5/006; B01D 1/14; B01D 1/0011; B01D 5/0012; C01B 19/02
See application file for complete search history.

(56) References Cited

U.S. PATENT DOCUMENTS 3,357,786 A * 12/1967 Giesekus .............. C01B 19/007
423/509

FOREIGN PATENT DOCUMENTS

JP 55-158110 A 12/1980
JP 60-28001 U 2/1985
(Continued)

OTHER PUBLICATIONS

Decision to Grant a Patent, issued in Japanese priority application No. 2015-099346, dated Dec. 28, 2015.
(Continued)

*Primary Examiner* — Renee Robinson
*Assistant Examiner* — Derek N Mueller
(74) *Attorney, Agent, or Firm* — Birch, Stewart, Kolasch & Birch, LLP

(57) ABSTRACT

A vapor circulation regeneration system is provided for utilizing a vapor by circulation and regeneration. The system includes at least: a liquefaction regeneration unit including a liquefaction space where the vapor of an object to be heated is liquefied and a heating part for maintaining a liquid-like state; a vaporization unit for heating the liquid-like material by means of a heating part so as to generate a vapor; a fluid communication part for establishing fluid communication between the liquefaction regeneration unit and the vaporization unit; a processing unit for processing an object to be processed by using the vapor; a return pipe for returning the vapor used in the processing unit to the liquefaction regeneration unit; a liquefaction regeneration temperature control part for controlling the temperature of
(Continued)

the liquefaction regeneration unit; and a vaporization temperature control part for controlling the temperature of the vaporization unit.

4 Claims, 3 Drawing Sheets

(51) Int. Cl.
    *C01B 19/02*     (2006.01)
    *B01D 1/14*     (2006.01)
    *B01D 3/10*     (2006.01)

(52) U.S. Cl.
    CPC ............. *B01D 1/0082* (2013.01); *B01D 1/14* (2013.01); *B01D 3/10* (2013.01); *B01D 5/00* (2013.01); *B01D 5/0012* (2013.01); *C01B 19/02* (2013.01)

(56) References Cited

FOREIGN PATENT DOCUMENTS

| | | | |
|---|---|---|---|
| JP | 2012-153583 A | 8/2012 | |
| JP | 2013-203655 A | 10/2013 | |

OTHER PUBLICATIONS

International Search Report, issued in PCT/JP2016/056864, dated Mar. 29, 2016.
Notification of Reasons for Refusal, issued in Japanese priority application No. 2015-099346, dated Oct. 30, 2015.

\* cited by examiner

VAPOR CIRCULATION REGENERATION SYSTEM

TECHNICAL FIELD

The present invention relates to a vapor circulation regeneration system for utilizing a vapor by circulation and regeneration.

BACKGROUND ART

Hydrogen compound gases each of which is a compound of a metal or the like and hydrogen are widely used in semiconductor fabrication. For example, hydrogen selenide is employed as a doping gas for a silicon semiconductor or as a raw material for a solar cell fabricated from a chalcopyrite type compound semiconductor (see Patent Documents 1 and 2). The hydrogen selenide is a highly toxic gas and hence its handling is difficult. Thus, a large amount of safety measure cost is necessary in a supply system and an exhaust system for the gas and hence such a fabrication facility requires a high cost.

As another fabrication method for the chalcopyrite type compound semiconductor, a seleniding method is investigated in which heat treatment is performed in a selenium vapor atmosphere so that film fabrication is achieved. In comparison with the method employing hydrogen selenide, in the method employing a selenium vapor, although corrosiveness is present, safety is remarkably improved and hence easy handling is achieved.

PRIOR ART DOCUMENT

Patent Document

Patent Document 1: JP Laid-open Publication No. 2012-153583
Patent Document 2: JP Laid-open Publication No. 2013-203655

GENERAL DESCRIPTION OF THE INVENTION

Problem to be Solved by the Invention

Nevertheless, in the prior art, the used corrosive vapor is discarded after detoxification treatment and hence a problem of high fabrication cost is caused.

Thus, a technical problem to be solved by the present invention is to provide a vapor circulation regeneration system for utilizing various kinds of vapors including such a corrosive vapor by circulation and regeneration.

Means for Solving Problem

In order to solve the above-mentioned technical problem, the present invention provides a vapor circulation regeneration system described below.

That is, the vapor circulation regeneration system according to the present invention is characterized by including at least:

a liquefaction regeneration unit for liquefying a vapor of an object to be heated so as to generating a liquid-like material, the liquefaction regeneration unit being provided with a liquefaction space where the vapor of the object to be heated is liquefied by heat exchange with a fluid flowing through an inside of a pipe and provided with a heating part for maintaining a liquid-like state;

a vaporization unit for heating by means of a heating part the liquid-like material obtained from the liquefaction regeneration unit so as to generate a vapor;

a fluid communication part for establishing fluid communication between the liquefaction regeneration unit and the vaporization unit so as to guide to the vaporization unit the liquid-like material obtained from the liquefaction regeneration unit;

a processing unit for processing an object to be processed by using the vapor;

a return pipe for returning the vapor used in the processing unit to the liquefaction regeneration unit;

a liquefaction regeneration temperature control part for controlling a temperature of the liquefaction regeneration unit; and a vaporization temperature control part for controlling a temperature of the vaporization unit, wherein the object to be heated is present in a solid state at ordinary temperatures, present in a vapor state and the liquid-like state in the liquefaction regeneration unit, present in the liquid-like state in the fluid communication part, present in the liquid-like state and the vapor state in the vaporization unit, and present in the vapor state in the processing unit and the return pipe.

According to the present invention, the object to be heated present in the solid state at ordinary temperatures is circulated in a manner that the state appropriately varies into the vapor state and the liquid-like state in the liquefaction regeneration unit, the vaporization unit, the processing unit, and the return pipe, so that the vapor can be utilized by circulation and regeneration and hence the fabrication cost can be reduced.

It is preferable that a carrier gas for carrying the vapor flows through a loop-shaped pipe arranged in an upper space of the vaporization unit so as to be heated and is then ejected through a hole of a nozzle pipe provided in fluid communication with the lower part of the loop-shaped pipe toward the liquid-like material for vaporization. According to this configuration, a longer heating path is realized than in a straight pipe so that the carrier gas can be heated to a more homogeneous temperature and then the carrier gas can more efficiently carry the vapor generated from the liquid-like material.

It is preferable that the liquefaction space is formed within an upper space of a liquefaction container by an outer partition plate and wherein a space for heat exchange with the fluid flowing through the inside of the pipe is formed within the liquefaction space by an inner partition plate for partitioning the space in a manner permitting fluid communication with each other. According to this configuration, a longer cooling path is realized and hence the vapor can efficiently be liquefied even when the liquefaction space is small.

It is preferable that a raw material supplying nozzle for supplying the object to be heated in the solid state is arranged on the outer side of the outer partition plate within the upper space of the liquefaction container. According to this configuration, the object to be heated in the solid state is supplied to the high-temperature liquid-like material collected in the lower space of the liquefaction container, without being cooled in the liquefaction space.

Effect of the Invention

In the vapor circulation regeneration system according to the present invention, the object to be heated is circulated in a manner that the state appropriately varies into the vapor state and the liquid-like state in the liquefaction regeneration unit, the vaporization unit, the processing unit, and the return pipe, so that the vapor can be utilized by circulation and regeneration and hence the fabrication cost can be reduced. Here, the "object to be heated" in the present patent application is a generic name of a particular raw material in the solid state, the liquid-like state, or the vapor state.

MODES FOR CARRYING OUT THE INVENTION

A vapor circulation regeneration system 1 according to an embodiment is described below with reference to FIGS. 1 to 4. Here, the application of the vapor circulation regeneration system 1 is not limited to fabrication of a compound semiconductor by using a corrosive vapor.

Figure 1:
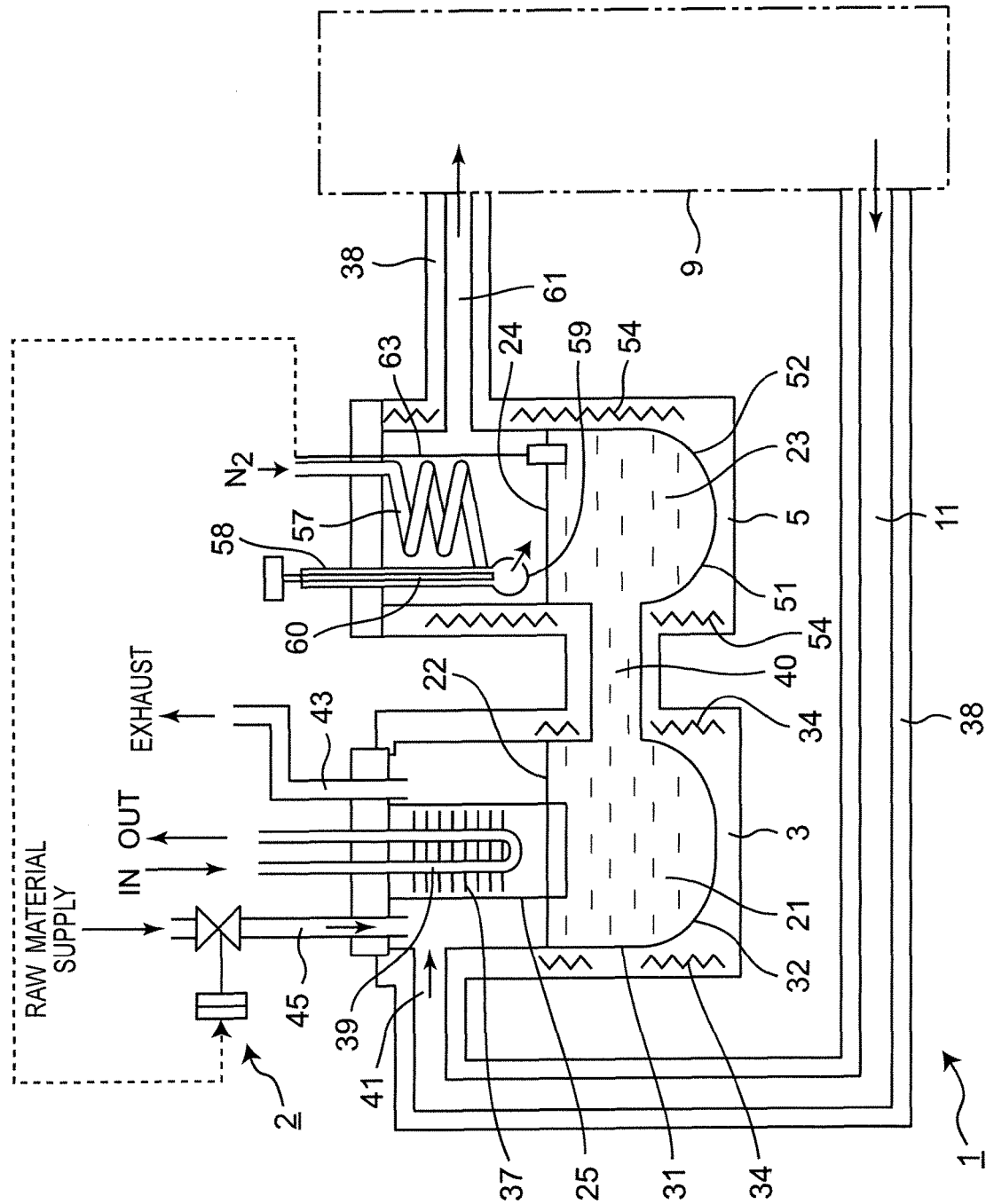
FIG. 1 is a system diagram showing a vapor circulation regeneration system according to an embodiment of the present invention.

As shown in FIG. 1, the vapor circulation regeneration system 1 includes: a liquefaction regeneration unit 3; a vaporization unit 5; a processing unit 9; a raw material supply unit 2; a pipe for supplying a carrier gas (a nitrogen gas) and an additive gas; and a vacuum pump for discharging the gas to the outside of the system after toxic substances are removed. Here, in the vapor circulation regeneration system 1, the passage through which at least a vapor and liquid-like materials 21 and 23 flow includes a heating and heat retention structure for controlling the temperature of the fluid. Further, in the inside of the system, in order that oxidation of the vapor of the liquid-like material may be avoided, air is exhausted by the vacuum pump and then replaced by a nitrogen gas in some occasions. Thus, the present system has a structure capable of withstanding the vacuum. Here, in the inside of the system, the pressure inside the system is monitored by a pressure gage (not shown) and then the liquefaction and the vaporization are controlled at arbitrary pressures. (In an example of the present system, a weakly reduced pressure of −5 to −10 KPa or the like is employed.)

The liquefaction regeneration unit 3 has a function that the used vapor used in the processing unit 9 and then returned from the processing unit 9 goes into contact with cooling fins 37 and an air pipe 39 so as to be liquefied. A liquefaction container 31 of the liquefaction regeneration unit 3 is heated by the heating part 34 to a temperature higher than or equal to the melting temperature of the object to be heated and not causing vapor generation and then stores the liquid-like material 21 obtained by the liquefaction. When the liquid surface 22 of the liquid-like material 21 obtained by the liquefaction in the liquefaction container 31 falls, the object to be heated in a solid state having a solid form referred to as prill is supplied and refilled from the raw material supply unit 2. For example, the object to be heated is composed of metallic selenium (Se) or nonmetallic sulfur (S) and is liquefied in the liquefaction container 31 and forms a selenium vapor or a sulfur vapor in the vaporization unit 5. Such a vapor is a so-called corrosive vapor having corrosiveness at high temperatures.

The vaporization unit 5 includes: a vaporization container 51 for storing the liquid-like material 23 for vaporization; a heating part 54 for heating the vaporization container 51 containing the liquid-like material 23 for vaporization; and a loop-shaped pipe 57 serving as a carrier gas heating part for heating the carrier gas in advance. Fluid communication between a lower part 32 of the liquefaction container 31 of the liquefaction regeneration unit 3 and a lower part 52 of the vaporization container 51 of the vaporization unit 5 is established by the fluid communication part 40 so that the liquid surface 22 in the liquefaction regeneration unit 3 and the liquid surface 24 in the vaporization unit 5 are at the same level as each other. The vaporization container 51 of the vaporization unit 5 is maintained at a temperature higher than the melting temperature of the object to be heated and lower than the boiling temperature of the object to be heated and is in a state that the vapor of the object to be heated is generated from the liquid surface 24 of the vaporization container 51 storing the liquid-like material 23 for vaporization. The vapor of the object to be heated is carried together with the carrier gas to the processing unit 9.

For example, in the processing unit 9, the vapor from the vaporization unit 5 is heated further in advance to a predetermined temperature so as to be used in film fabrication of a compound semiconductor or, alternatively, the vapor from the vaporization unit 5 is used directly in film fabrication of a compound semiconductor. The vapor used in the processing unit 9 is returned through the return pipe 11 to the liquefaction regeneration unit 3.

For example, the processing unit 9 is a unit used in film fabrication of a compound semiconductor and is a unit used in film fabrication by using a corrosive vapor such as a selenium (Se) vapor and a sulfur (S) vapor. For example, the corrosive vapor such as a selenium (Se) vapor and a sulfur (S) vapor is used in fabrication of a chalcopyrite type compound semiconductor. The chalcopyrite type compound semiconductor has a higher photoelectric conversion efficiency than a crystalline or amorphous silicon (Si)-based one. Thus, investigation is performed that the chalcopyrite type compound semiconductor is used as a solar cell for converting the sunlight into electrical energy. In the processing unit 9, an additive gas introducing pipe for adding an additive gas may be connected.

Among compound semiconductors $(Ag,Cu)(Al,In,Ga)(S,Se)_2$ having a chalcopyrite structure, in particular, in compound semiconductors $Cu(In,Ga)(S,Se)_2$ employing copper (Cu) as a group-I material, indium (In) and gallium (Ga) as group-III materials, and sulfur (S) and selenium (Se) as group-VI materials and referred to as so-called CIGS compound semiconductors, a band gap ideal for optical absorption in a solar cell can be realized and hence CIS-based thin-film solar cells employing such CIGS compound semiconductors have high photoelectric conversion efficiencies.

In order that a CIS-based thin film may be formed, for example, a method may be employed that the constituent elements of copper, indium, and selenium are employed as sources so as to be vapor-deposited simultaneously to each other. Further, a seleniding method is employed that a stacked film obtained by individual film formation of copper and indium is heated in an atmosphere of hydrogen selenide or a selenium vapor so as to be selenided.

Among such seleniding methods, in a method employing hydrogen selenide, the hydrogen selenide is toxic and hence its handling is difficult. Thus, a large amount of safety measure cost is necessary in the supply system and the exhaust system for the gas and hence such a fabrication facility requires a high cost. On the other hand, among the seleniding methods, in a method employing a selenium vapor, safety is remarkably improved. Nevertheless, it is recognized that a photoelectric conversion efficiency is unsatisfactory in comparison with the method employing hydrogen selenide. A large number of selenium vapors easily bind together so as to form huge molecular assemblies and hence an unsatisfactory diffusion property into the inside of the film of copper or indium is caused. This fact is recognized as a factor of degrading the photoelectric conversion efficiency.

In the vaporization unit 5 for vaporizing the liquefied selenium or the like, it may seem that when the heating temperature of the liquefied selenium is raised, formation of huge molecular assemblies becomes difficult to occur. Nevertheless, when the heating temperature is raised, the vapor pressure rises and hence the rate of vaporization of selenium increases so that the occurrence of binding in the selenium vapor increases. Thus, the formation of huge molecular assemblies is hardly suppressed. Further, in order that the heating temperature may be increased, the heating part and the heat insulation part in the vaporization unit 5 need adapt such high temperatures and hence a problem of increase in size and cost is caused in the vaporization unit 5.

Thus, investigation is performed that the selenium vapor generated by the vaporization unit 5 is heated further so that the huge molecular assemblies of selenium are decomposed (cracked) into small ones so as to be modified. Thus, the vapor may be heated further in advance to a predetermined temperature.

Figure 3:
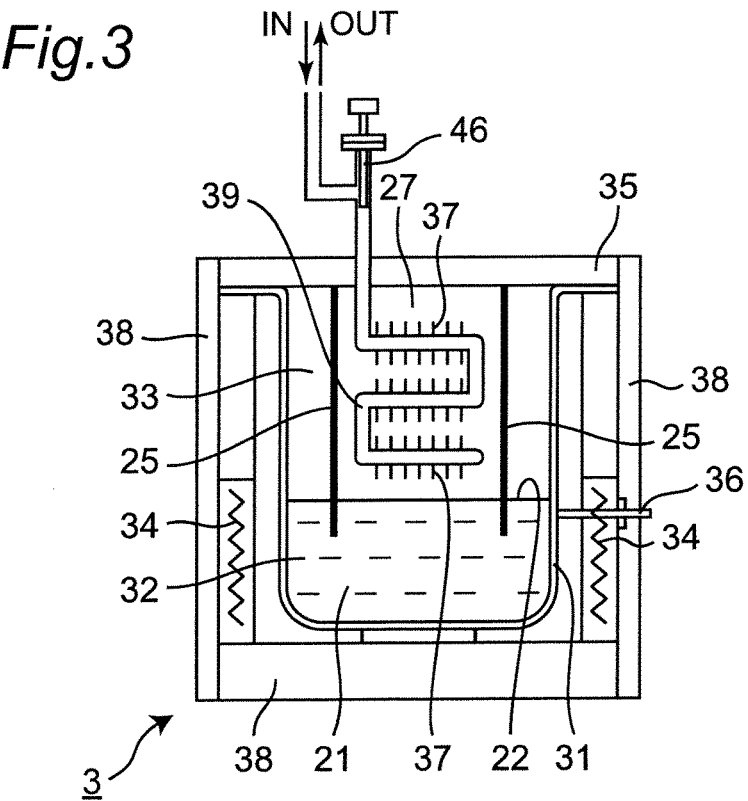
FIG. 3 is a sectional view taken along line III-III in arrow direction in FIG. 2.
Figure 4:
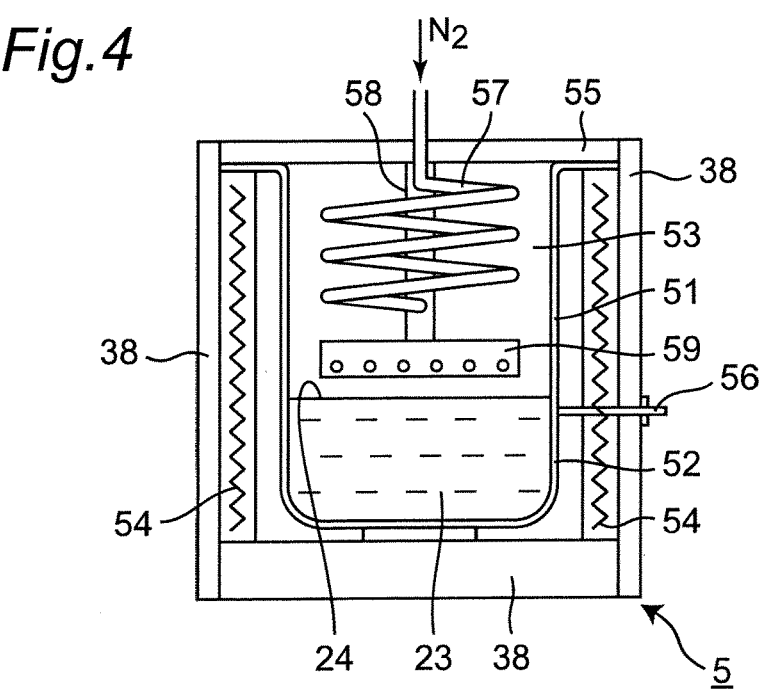
FIG. 4 is a sectional view taken along line IV-IV in arrow direction in FIG. 2.

Next, the liquefaction regeneration unit 3 and the vaporization unit 5 in the vapor circulation regeneration system 1 are described in detail with reference to FIGS. 2 to 4.

Figure 2:
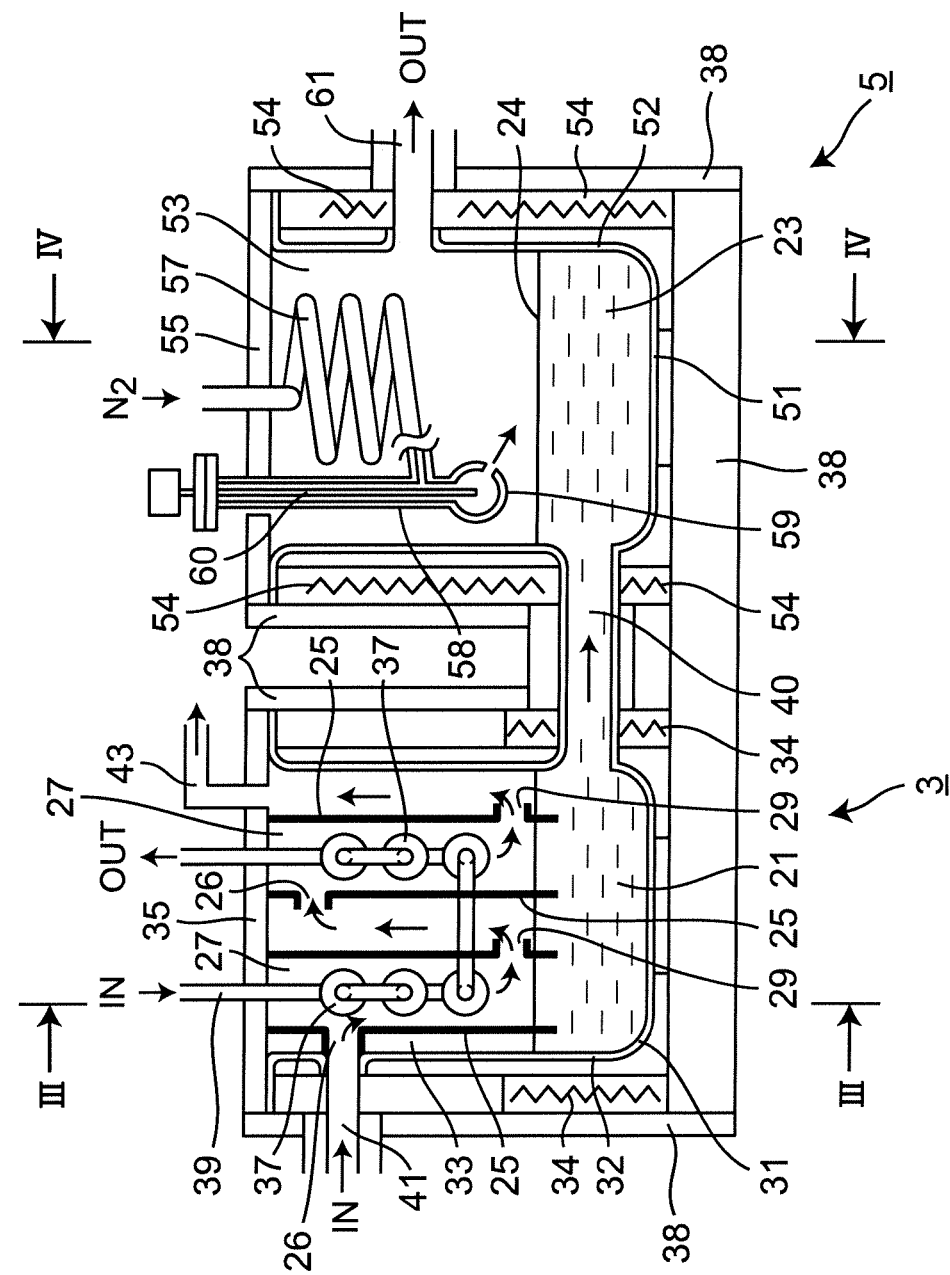
FIG. 2 is a detailed front view of a liquefaction regeneration unit and a vaporization unit within a vapor circulation regeneration system shown in FIG. 1.

FIG. 2 is a detailed front view of the liquefaction regeneration unit 3 and the vaporization unit 5. FIG. 3 is a sectional view taken along line in arrow direction in FIG. 2. FIG. 4 is a sectional view taken along line IV-IV in arrow direction in FIG. 2.

The liquefaction regeneration unit 3 includes a liquefaction container 31, a heating part 34, an air pipe 39, cooling fins 37, and a liquefaction regeneration temperature control part (not shown). The liquefaction container 31 has a cylindrical shape with a bottom and is constructed from an austenitic stainless steel material having corrosion resistance against the liquid-like material 21 obtained by liquefaction and against the vapor. The heating part 34 constructed from a ceramic fiber heater is arranged such as to surround the outer periphery of the lower part 32 of the liquefaction container 31. A heat insulating material 38 is arranged such as to surround the upper part, the upper face, and the lower face of the liquefaction container 31 as well as the heating part 34. The temperature of the lower part 32 of the liquefaction container 31 is measured by a thermocouple 36. The upper flange part of the liquefaction container 31 is covered by a top plate 35 so that the inner space of the liquefaction container 31 is sealed.

The liquefaction regeneration temperature control part controls the liquefaction regeneration unit 3 to be maintained at a liquefaction regeneration temperature higher than or equal to the melting temperature of the object to be heated (e.g., 221° C. in selenium and 115° C. in sulfur) and not causing vapor generation by vaporization from the liquid-like material 21 obtained by the liquefaction. By virtue of this, the liquid-like material 21 obtained by the liquefaction is stored in the lower part 32 of the liquefaction container 31.

An upper space 33 of the liquefaction container 31 is partitioned into a plurality of liquefaction spaces 27 by a plurality of partition plates 25. The air pipe 39 and the cooling fins 37 are arranged in each liquefaction space 27. When hot air heated to a predetermined temperature suitable for liquefaction of the vapor flows through the inside of the air pipe 39 provided with the cooling fins 37, heat exchange is performed with the vapor located in the upper space 33 of the liquefaction container 31. The temperature of hot air is measured by a thermocouple 46. In the course of being introduced through an inlet 26 of the liquefaction space 27 and then delivered through an outlet 29, the vapor is cooled by the cooling fins 37 so as to be liquefied. The liquid-like material to be heated drips and is then mixed into the liquid-like material 21 obtained by the liquefaction stored in the lower part 32 of the liquefaction container 31.

The vapor is supplied through an introduction pipe 41 (shown in FIG. 1) hermetically connected to an introduction hole provided in the side wall in the center portion in the height direction of the liquefaction container 31. The introduction pipe 41 is connected to the return pipe 11 connected to the processing unit 9. Thus, the vapor supplied through the introduction pipe 41 to the liquefaction regeneration unit 3 is the used vapor used in the processing unit 9 and then returned from the processing unit 9.

A carrier gas discharging part 43 for discharging the carrier gas to the outside of the system is connected to the top plate 35. The carrier gas from the carrier gas discharging part 43 in which the object to be heated has been removed by the liquefaction by the cooling fins 37 and the air pipe 39 flows through a water-cooled trap and a filter (not shown) so that the object to be heated is completely removed (that is, detoxification treatment is performed). After that, the carrier gas undergone the detoxification treatment is discharged to the outside of the system.

A raw material supplying nozzle 45 (shown in FIG. 1) for refilling the object to be heated whose amount has decreased by consumption is connected to the top plate 35. A level detection part 63 provided in the vaporization unit 5 detects the liquid surface level of the vaporization unit 5. Fluid communication between the lower part 32 of the liquefaction container 31 of the liquefaction regeneration unit 3 and the lower part 52 of the vaporization container 51 of the vaporization unit 5 is established through the fluid communication part 40 and hence the level of the liquid surface 22 of the liquefaction regeneration unit 3 becomes the same as the level of the liquid surface 24 of the vaporization unit 5. As a result, the liquid surface level of the liquefaction regeneration unit 3 is detected by the level detection part 63. When the liquid surface 24 of the liquid-like material 23 for vaporization falls, the object to be heated having a solid form referred to as prill is supplied and refilled from the raw material supply unit 2 through the raw material supplying nozzle to the liquefaction container 31 of the liquefaction regeneration unit 3.

The vaporization unit 5 includes a vaporization container 51, a heating part 54, a loop-shaped pipe 57, and a vaporization temperature control part (not shown). The vaporization container 51 has a cylindrical shape with a bottom and is constructed from an austenitic stainless steel material having corrosion resistance against the liquid-like material 23 for vaporization and against the vapor. The heating part 54 constructed from a ceramic fiber heater is arranged such as to surround the upper space 53 and the lower part 52 of the vaporization container 51. A heat insulating material 38 is arranged such as to surround the upper part, the upper face, and the lower face of the vaporization container 51 as well as the heating part 54. The temperature of the lower part 52 of the vaporization container 51 is measured by a thermocouple 56. The upper flange part of the vaporization container 51 is covered by a top plate 55 so that the inner space of the vaporization container 51 is sealed. The level detection part 63 for detecting the liquid surface level of the liquid-like material 23 for vaporization stored in the vaporization container 51 and the loop-shaped pipe 57 are hung from the top plate 55.

By virtue of the vaporization temperature control part, the vaporization unit 5 is controlled at a vaporization temperature permitting vapor generation from the liquid-like material 23 for vaporization. Examples of the vaporization temperature are 400° C. to 500° C. in a case that the object to be heated is selenium and 200° C. to 300° C. in a case that the object to be heated is sulfur. When the vaporization unit 5 is controlled at the vaporization temperature, a vapor is generated from the liquid surface 24 of the liquid-like material 23 for vaporization stored in the vaporization container 51.

The loop-shaped pipe 57 serving as heating means for heating in advance a carrier gas (e.g., a nitrogen gas) introduced newly is arranged in the upper space 53 of the vaporization container 51. When the carrier gas flows through the inside of the loop-shaped pipe 57, the carrier gas is heated in advance so that separate heating means becomes unnecessary to be provided. The temperature of the heated carrier gas is measured by a thermocouple 60. The thermocouple 60 is arranged in the inside of a support pipe 58. The carrier gas heated in advance is ejected from a nozzle pipe 59 attached to the lower part of the loop-shaped pipe 57 linked to the support pipe 58 so as to be mixed with the vapor obtained by vaporization from the liquid-like material 23 for vaporization.

The vapor mixed with the carrier gas is delivered through a delivery pipe 61 hermetically connected to a delivery hole provided in the center portion in the height direction of the side wall of the vaporization container 51. Thus, the vapor obtained by vaporization in the vaporization unit 5, together with the carrier gas, is carried through the delivery pipe 61 (shown in FIG. 1) to the processing unit 9.

The vapor together with the carrier gas goes into the processing unit 9 and is then used in film fabrication of a compound semiconductor. The vapor used in the processing unit 9 is returned through the return pipe 11 to the upper space 33 of the liquefaction regeneration unit 3.

According to the above-mentioned vapor circulation regeneration system 1, the object to be heated is circulated in the liquefaction regeneration unit 3, the vaporization unit 5, the processing unit 9, and the return pipe 11 in a manner that the state appropriately varies into the vapor and the liquid-like materials 21 and 23. Thus, the vapor can be utilized by circulation and regeneration and hence the fabrication cost for the compound semiconductor or the like can be reduced.

Here, the description given above has been performed by using detailed configurations and numerical values for the purpose of easy understanding of the present invention. However, the present invention is not limited to the detailed configurations and numerical values in each embodiment given above and encompasses various kinds of modifications falling within a scope not departing from the contents described in the claims. For example, the vapor circulation regeneration system 1 in which a corrosive vapor is used in fabrication of a solar cell among compound semiconductors has been illustrated. However, its applications are not limited to this. For example, the vapor circulation regeneration system 1 may be applied to fabrication of a compound semiconductor other than the solar cell and to formation of a vapor deposition plated layer onto a steel plate. Further, metallic selenium (Se) vapor or nonmetallic sulfur (S) vapor has been illustrated as the vapor. Instead, the present system may be applied to any other corrosive vapor or a noncorrosive vapor.

EXPLANATIONS OF LETTERS AND NUMERALS 1 vapor circulation regeneration system
2 raw material supply unit
3 liquefaction regeneration unit
5 vaporization unit
9 processing unit
11 return pipe
21 liquid-like material obtained by a liquefaction
22 liquid surface
23 liquid-like material
24 liquid surface
25 partition plate
26 inlet
27 liquefaction space
29 outlet
31 liquefaction container
32 lower part
33 upper space
34 heating part
35 top plate
36 thermocouple
37 cooling fin
38 heat insulating material
39 air pipe
40 fluid communication part
41 introduction pipe
43 carrier gas discharging part
45 raw material supplying nozzle
46 thermocouple
51 vaporization container
52 lower part
53 upper space
54 heating part
55 top plate
56 thermocouple
57 loop-shaped pipe
58 support pipe
59 nozzle pipe
60 thermocouple
61 delivery pipe
63 level detection part

The invention claimed is:
1. A vapor circulation regeneration system comprising at least:
a liquefaction regeneration unit for liquefying a vapor of an object to be heated so as to generate a liquid-like material, the liquefaction regeneration unit being provided with a liquefaction space where the vapor of the object to be heated is liquefied by heat exchange with a fluid flowing through an inside of a pipe and provided with a first heating part for maintaining the object to be heated in a liquid-like state, and the liquefaction space being separated from the first heating part;
a vaporization unit for heating by means of a second heating part the liquid-like material obtained from the liquefaction regeneration unit so as to generate a vapor;

a fluid communication pipe for establishing fluid communication between the liquefaction regeneration unit and the vaporization unit so as to guide to the vaporization unit the liquid-like material obtained from the liquefaction regeneration unit; and a return pipe for returning the vapor used for processing a processing object to the liquefaction regeneration unit, wherein the object to be heated is present in a vapor state and the liquid-like state in the liquefaction regeneration unit, present in the liquid-like state in the fluid communication pipe, present in the liquid-like state and the vapor state in the vaporization unit, and present in the vapor state in the return pipe.

2. The vapor circulation regeneration system according to claim 1, wherein a carrier gas for carrying the vapor flows through a loop-shaped pipe arranged in an upper space of the vaporization unit so as to be heated and is then ejected through a hole of a nozzle pipe provided in fluid communication with the lower part of the loop-shaped pipe toward the liquid-like material for vaporization.

3. The vapor circulation regeneration system according to claim 1, wherein a plurality of the liquefaction spaces are formed in an upper space of a liquefaction container by a plurality of partition plates arranged in the upper space of the liquefaction container, the partition plates have an inlet or an outlet, and adjacent liquefaction spaces are in fluid communication with each other through the inlet or the outlet.

4. The vapor circulation regeneration system according to claim 3, wherein a raw material supplying nozzle for supplying an object to be heated in a solid state is arranged outside an outer partition plate among the plurality of partition plates within the upper space of the liquefaction container.

* * * * *